(12) United States Patent
Gabbianelli et al.

(10) Patent No.: US 6,713,707 B2
(45) Date of Patent: *Mar. 30, 2004

(54) WELDING MATERIAL AND METHOD WITHOUT CARRIER

(75) Inventors: Gianfranco Gabbianelli, Troy, MI (US); Richard D. Ashley, Berkley, MI (US); Victor J. Malczewski, Warren, MI (US)

(73) Assignee: Magna International, Inc., Aurora (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/042,383

(22) Filed: Jan. 11, 2002

(65) Prior Publication Data

US 2002/0100746 A1 Aug. 1, 2002

Related U.S. Application Data

(63) Continuation-in-part of application No. 09/518,646, filed on Mar. 3, 2000, now Pat. No. 6,346,684.

(51) Int. Cl.7 .................... B23K 9/28; B23K 11/00; B23K 31/02; H05B 1/00
(52) U.S. Cl. .................... 219/94; 219/53; 219/59.1; 219/61; 219/61.2; 219/230
(58) Field of Search ................ 219/94, 117.1, 219/53, 59.1, 61, 61.1, 61.2, 230

(56) References Cited

U.S. PATENT DOCUMENTS

| 1,581,931 A | 4/1926 | Lamplugh |
| 1,846,567 A | 2/1932 | Murray, Jr. |
| 2,269,451 A | 1/1942 | Ford ........................ 296/28 |
| 2,389,907 A | 11/1945 | Helmuth .................... 296/28 |
| 2,467,636 A | 4/1949 | Stoudt et al. ................ 219/4 |
| 2,668,722 A | 2/1954 | Muller ...................... 280/106 |
| 2,787,699 A | 4/1957 | Jessen |
| 3,122,629 A | 2/1964 | Manz ......................... 219/74 |
| 3,159,419 A | 12/1964 | Kerby ........................ 296/28 |
| 3,630,056 A | 12/1971 | Cuq ........................... 72/28 |
| 3,644,695 A | 2/1972 | Shuey et al. ............... 219/59.1 |
| 3,718,798 A | 2/1973 | Randolph et al. ........ 219/125.12 |
| 3,876,852 A | 4/1975 | Topham ................... 219/137 R |
| 3,900,151 A | 8/1975 | Schoer et al. |

(List continued on next page.)

FOREIGN PATENT DOCUMENTS

| DE | 867059 | 1/1953 |
| DE | 4122862 | 1/1993 |

(List continued on next page.)

OTHER PUBLICATIONS

"Lighter Car Body in Aluminum wqith Hydroforming Technology R&D Results," Hanicke et al., IBEC 96, Oct. 1–3, 1996, Volvo Car Corporation.

International Application No. PCTR/CA 98/00962, PCT Search Report, mailed Jan. 17, 1999, Magna International Inc.

(List continued on next page.)

Primary Examiner—L. Edmondson
(74) Attorney, Agent, or Firm—Pillsbury Winthrop LLP

(57) ABSTRACT

A welding material is constructed and arranged to be positioned in electrically conductive relation between exterior surface portions of first and second weldable members at a location where the first and second weldable members are to be joined. The welding material includes at least one welding material member constructed of an electrically conductive metallic welding material capable of melting when heated by application of an electrical current. Each welding material member is mounted on the exterior surface of the first weldable member and then positioned between the exterior surfaces of the first and second weldable members to be electrically conductively disposed therebetween.

16 Claims, 5 Drawing Sheets

U.S. PATENT DOCUMENTS

| | | | |
|---|---|---|---|
| 3,971,588 A | 7/1976 | Bauer | 296/28 |
| 4,023,557 A | 5/1977 | Thorne et al. | |
| 4,051,704 A | 10/1977 | Kimura | 72/58 |
| 4,141,482 A | 2/1979 | Reynolds | |
| 4,142,085 A | 2/1979 | Knipstrom et al. | 219/61 |
| 4,150,274 A | 4/1979 | Minin et al. | |
| 4,192,374 A * | 3/1980 | Hayden et al. | 165/158 |
| 4,355,844 A | 10/1982 | Muzzarelli | 296/205 |
| 4,408,112 A * | 10/1983 | Kazlauskas | 219/61 |
| 4,441,006 A | 4/1984 | Machida et al. | 219/85 |
| 4,471,519 A | 9/1984 | Capello et al. | 29/460 |
| 4,592,577 A * | 6/1986 | Ayres et al. | 285/288.1 |
| 4,611,830 A * | 9/1986 | von Ahrens | 219/53 |
| 4,618,163 A | 10/1986 | Hasler et al. | 280/785 |
| 4,648,208 A | 3/1987 | Baldamus et al. | 49/502 |
| 4,656,328 A | 4/1987 | Weldon et al. | 219/59.1 |
| 4,660,345 A | 4/1987 | Browning | 4052/648 |
| 4,726,166 A | 2/1988 | DeRees | 52/694 |
| 4,728,760 A | 3/1988 | Brolin et al. | 219/617 |
| 4,735,355 A | 4/1988 | Browning | 228/189 |
| 4,759,111 A | 7/1988 | Cudini | 29/523 |
| 4,835,356 A | 5/1989 | Abe | 219/119 |
| 4,886,203 A * | 12/1989 | Puzrin et al. | 219/59.1 |
| 4,906,313 A | 3/1990 | Hill | 219/137 R |
| 4,906,823 A | 3/1990 | Kushima et al. | |
| 4,933,531 A | 6/1990 | Ichikawa et al. | 219/86.25 |
| 4,986,597 A | 1/1991 | Clausen | 296/205 |
| 5,031,958 A | 7/1991 | Fujita et al. | 296/214 |
| 5,094,313 A | 3/1992 | Mauws | 180/210 |
| 5,106,249 A | 4/1992 | Janotik | 411/43 |
| 5,107,095 A * | 4/1992 | Derbyshire | 219/230 |
| 5,170,557 A | 12/1992 | Rigsby | 138/148 |
| 5,209,541 A | 5/1993 | Janotik | 296/29 |
| 5,213,386 A | 5/1993 | Janotik et al. | 296/29 |
| 5,228,259 A | 7/1993 | Haddad et al. | 52/653.2 |
| 5,233,789 A | 8/1993 | Priest et al. | 49/360 |
| 5,233,856 A | 8/1993 | Shimanovski et al. | 72/62 |
| 5,269,585 A | 12/1993 | Klages et al. | 296/205 |
| 5,271,687 A | 12/1993 | Holka et al. | 403/233 |
| 5,320,403 A | 6/1994 | Kazyak | 296/203 |
| 5,320,697 A | 6/1994 | Hegler et al. | 219/110 |
| 5,332,281 A | 7/1994 | Janotik et al. | 296/29 |
| 5,333,775 A | 8/1994 | Bruggemann et al. | 228/157 |
| 5,338,080 A | 8/1994 | Janotik et al. | 296/29 |
| 5,343,666 A | 9/1994 | Haddad et al. | 52/648.1 |
| 5,380,978 A | 1/1995 | Pryor | 219/125.12 |
| 5,389,760 A | 2/1995 | Zollinger | 219/53 |
| 5,407,514 A * | 4/1995 | Butts et al. | 219/137 R |
| 5,407,520 A | 4/1995 | Butts et al. | 228/155 |
| 5,411,777 A | 5/1995 | Steele et al. | 428/34.9 |
| 5,445,001 A | 8/1995 | Snavely | |
| 5,458,393 A | 10/1995 | Benedyk | 296/203 |
| 5,460,026 A | 10/1995 | Schafer | 72/55 |
| 5,476,725 A | 12/1995 | Papich et al. | |
| 5,481,892 A | 1/1996 | Roper et al. | 72/61 |
| 5,518,209 A | 5/1996 | Chicoine et al. | 244/158 R |
| 5,549,352 A | 8/1996 | Janotik et al. | 296/209 |
| 5,561,902 A | 10/1996 | Jacobs et al. | 29/897.2 |
| 5,564,785 A | 10/1996 | Schultz et al. | 297/452.2 |
| 5,577,796 A | 11/1996 | Clausen | 296/202 |
| 5,581,947 A | 12/1996 | Kowall et al. | 49/451 |
| 5,582,052 A | 12/1996 | Rigsby | 72/62 |
| 5,600,983 A | 2/1997 | Rigsby | 72/61 |
| 5,617,992 A | 4/1997 | Huddleston et al. | |
| 5,641,176 A | 6/1997 | Alatalo | 280/690 |
| 5,649,735 A | 7/1997 | Tomforde et al. | 296/71 |
| 5,673,929 A | 10/1997 | Alatalo | 280/690 |
| 5,718,048 A | 2/1998 | Horton et al. | 29/897.2 |
| 5,720,092 A | 2/1998 | Ni et al. | 29/421.1 |
| 5,720,511 A | 2/1998 | Benedyk | 296/203 |
| 5,729,463 A | 3/1998 | Koenig et al. | 219/119 |
| 5,765,906 A | 6/1998 | Iwatsuki et al. | 296/203 |
| 5,783,794 A * | 7/1998 | Oikawa et al. | 138/148 |
| 5,794,398 A | 8/1998 | Kaehler et al. | 52/653.2 |
| 5,800,003 A | 9/1998 | Clenet | 296/29 |
| 5,818,008 A | 10/1998 | Cecil | 219/110 |
| 5,820,014 A | 10/1998 | Dozier, II et al. | |
| 5,829,124 A | 11/1998 | Kresge et al. | |
| 5,831,235 A | 11/1998 | Cecil | 219/110 |
| 5,845,382 A | 12/1998 | Schultz et al. | 29/421.1 |
| 5,848,853 A | 12/1998 | Clenet | 403/272 |
| 5,953,945 A | 9/1999 | Horton | 72/58 |
| 5,992,897 A * | 11/1999 | Hill et al. | 285/55 |
| 6,000,603 A | 12/1999 | Koskenmaki et al. | |
| 6,010,155 A * | 1/2000 | Rinehart | 219/61.2 |
| 6,037,556 A | 3/2000 | Rudd | 219/61.2 |
| 6,063,510 A | 5/2000 | Inabayashi et al. | |
| 6,068,176 A | 5/2000 | Petrikas | 228/56.3 |
| 6,092,865 A * | 7/2000 | Jaekel et al. | 296/205 |
| 6,131,954 A | 10/2000 | Campbell | 296/146.5 |
| 6,142,362 A | 11/2000 | Maus et al. | |
| 6,209,372 B1 | 4/2001 | Freeman | 219/86.25 |
| 6,225,598 B1 | 5/2001 | Nihei et al. | 219/137 |
| 6,323,458 B1 | 11/2001 | Nomura et al. | |
| 6,346,684 B1 | 2/2002 | Gabbianelli et al. | 219/617 |
| 6,405,761 B1 * | 6/2002 | Shimizu et al. | 138/109 |

FOREIGN PATENT DOCUMENTS

| | | |
|---|---|---|
| DE | 19530835 A1 | 2/1997 |
| EP | 0457400 A1 | 11/1991 |
| EP | 0570150 A1 | 11/1993 |
| EP | 0764493 A1 | 3/1997 |
| FR | 697774 | 12/1930 |
| JP | 63-230271 | 9/1988 |
| JP | 1-95891 A | 4/1989 |
| JP | 3-10089 A | 1/1991 |
| JP | 3-65572 | 3/1991 |
| JP | 3-133569 | 6/1991 |
| JP | 2000-17338 A | 1/2000 |
| WO | WO 97/00595 | 1/1997 |

OTHER PUBLICATIONS

US Pat. application Publication No. US2001/0000119 A1, Hydroformed Space Frame and Joints Therefor, Jaekel et al., Apr. 5, 2001.

US Pat. application Publication No. US2001/0019039 A1, Welding Assembly with Nestable Conductive Ends, Gabbianelli et al., Sep. 6, 2001.

\* cited by examiner

WELDING MATERIAL AND METHOD WITHOUT CARRIER

This application is a continuation-in-part of U.S. patent application Ser. No. 09/518,646, filed Mar. 3, 2000, now U.S. Pat. No. 6,346,684, which is hereby incorporated herein by reference in its entirety.

This application is also related to commonly assigned U.S. patent applications being filed concurrently herewith and titled Welding Material With Conductive Sheet and Method (PW Matter No. 280425) and Apparatus and Method for Welding Aluminum Tubes (PW Matter No. 280427), the entire contents of each being incorporated herein by reference thereto.

FIELD OF THE INVENTION

The present invention is generally related to welding and an illustrated embodiment of the present invention is related to welding tubular members.

BACKGROUND

Welding operations are used in many industrial applications, such as vehicle construction on vehicle assembly lines. To form certain welded connection, a desired amount of the welding material must be placed between the surfaces of the weldable members where the joint is to be formed and then heated. This type of joint is difficult to form when the weldable members are tubular in form because it becomes difficult to directly access the surfaces to be welded.

Tubular hydroforming technology is increasingly being used in industry, particularly in the automotive industry. Hydroforming technology offers many advantages for automobile frame construction, but the use of common welding methods for welding tubular components is difficult and can result in time and cost inefficiencies.

SUMMARY

An object of the present invention is to provide a method of welding tubular members, comprising providing first and second tubular members, each of the first and second tubular members having a respective exterior surface; providing at least one welding material member, each of the at least one welding material members being constructed of an electrically conductive metallic welding material capable of bonding in weld-forming relation with the first and second tubular members; securing each of the at least one welding material members on the first tubular member so that each of the at least one welding material members remains in a predetermined position on the first tubular member prior to being in contact with the second tubular member; positioning the second tubular member adjacent the first tubular member with the at least on welding material member being disposed in current transmitting relation between the respective exterior surfaces of the first and second tubular members; and applying an electrical current across the first and second tubular members such that the applied current flows through the respective exterior surfaces of the first and second tubular members and each of the at least one welding material members disposed between the first and second tubular members to weld the respective exterior surfaces of the first and second tubular members together.

Another object of the present invention is to provide a method of welding tubular members, comprising providing first and second tubular members, each of the first and second tubular members having a respective exterior surface; providing a plurality of welding material members, each of the welding material members being constructed of an electrically conductive metallic welding material capable of bonding in weld-forming relation with the first and second tubular members; welding each of the plurality of welding material members on the first tubular member so that each of the plurality of welding material members remains in a predetermined position on the first tubular member prior to being in contact with the second tubular member; positioning the second tubular member adjacent the first tubular member with the plurality of welding material members being disposed in current transmitting relation between the respective exterior surfaces of the first and second tubular members; and applying an electrical current across the first and second tubular members such that the applied current flows through the respective exterior surfaces of the first and second tubular members and each of the plurality of welding material members disposed between the first and second tubular members to weld the respective exterior surfaces of the first and second tubular members together.

Other objects, features, and advantages of the present invention will become apparent from the following detailed description, the accompanying drawings, and the appended claims.

BRIEF DESCRIPTION OF THE DRAWINGS

The accompanying drawings facilitate an understanding of the various embodiments of this invention. In such drawings.

DETAILED DESCRIPTION OF EMBODIMENTS OF THE INVENTION

Figure 1:
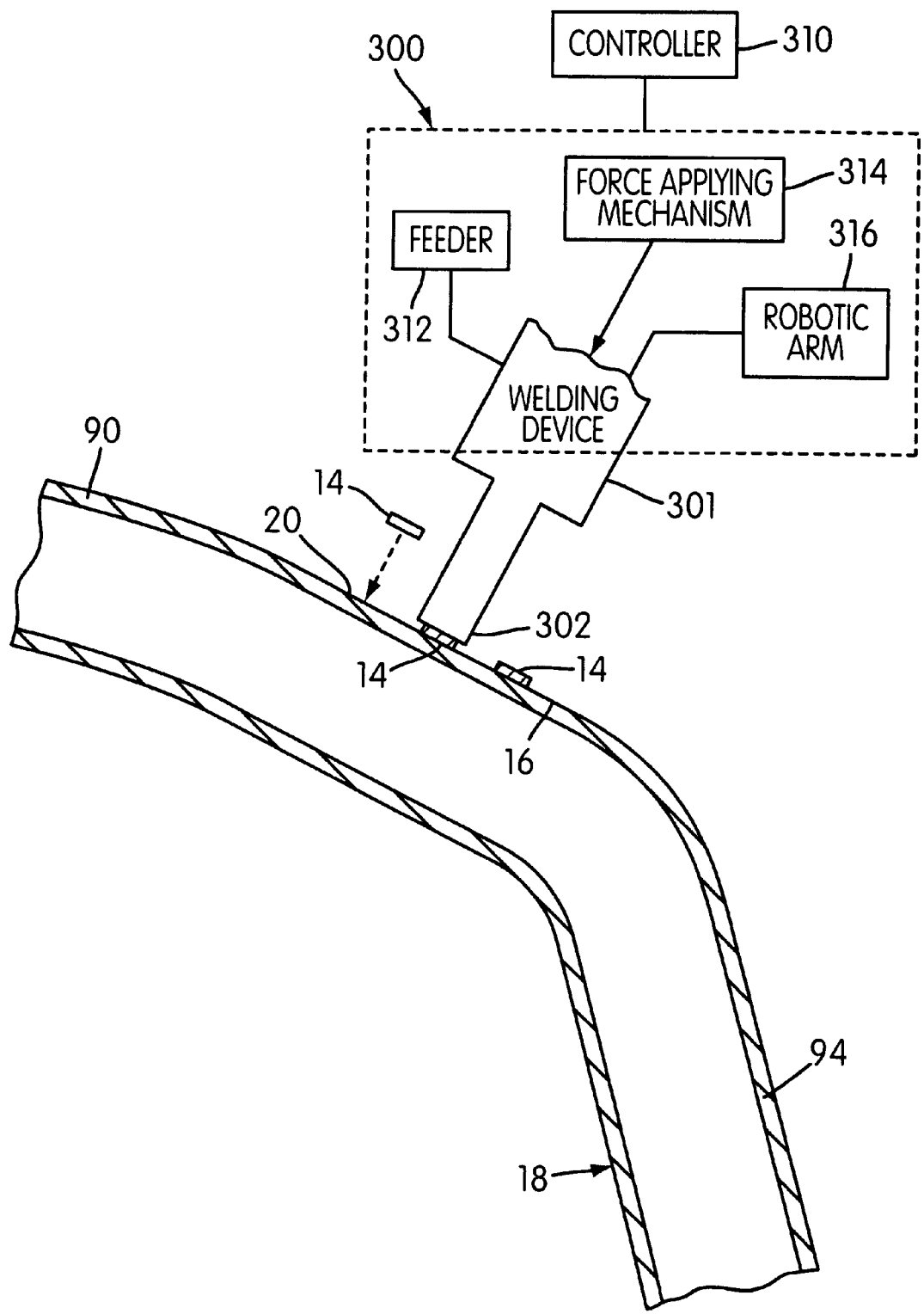
FIG. 1 is a cross-sectional view of a welding device and method according to the principles of the illustrated embodiment of the present invention.
Figure 3:
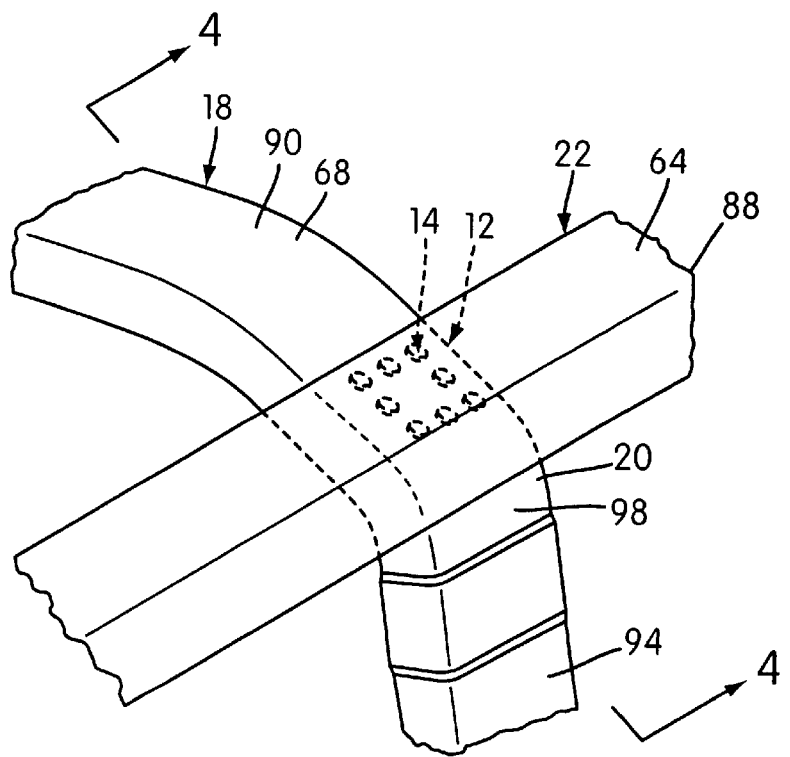
FIG. 3 is a perspective view similar to FIG. 2 but showing a second weldable member positioned on the first weldable member.
Figure 5:
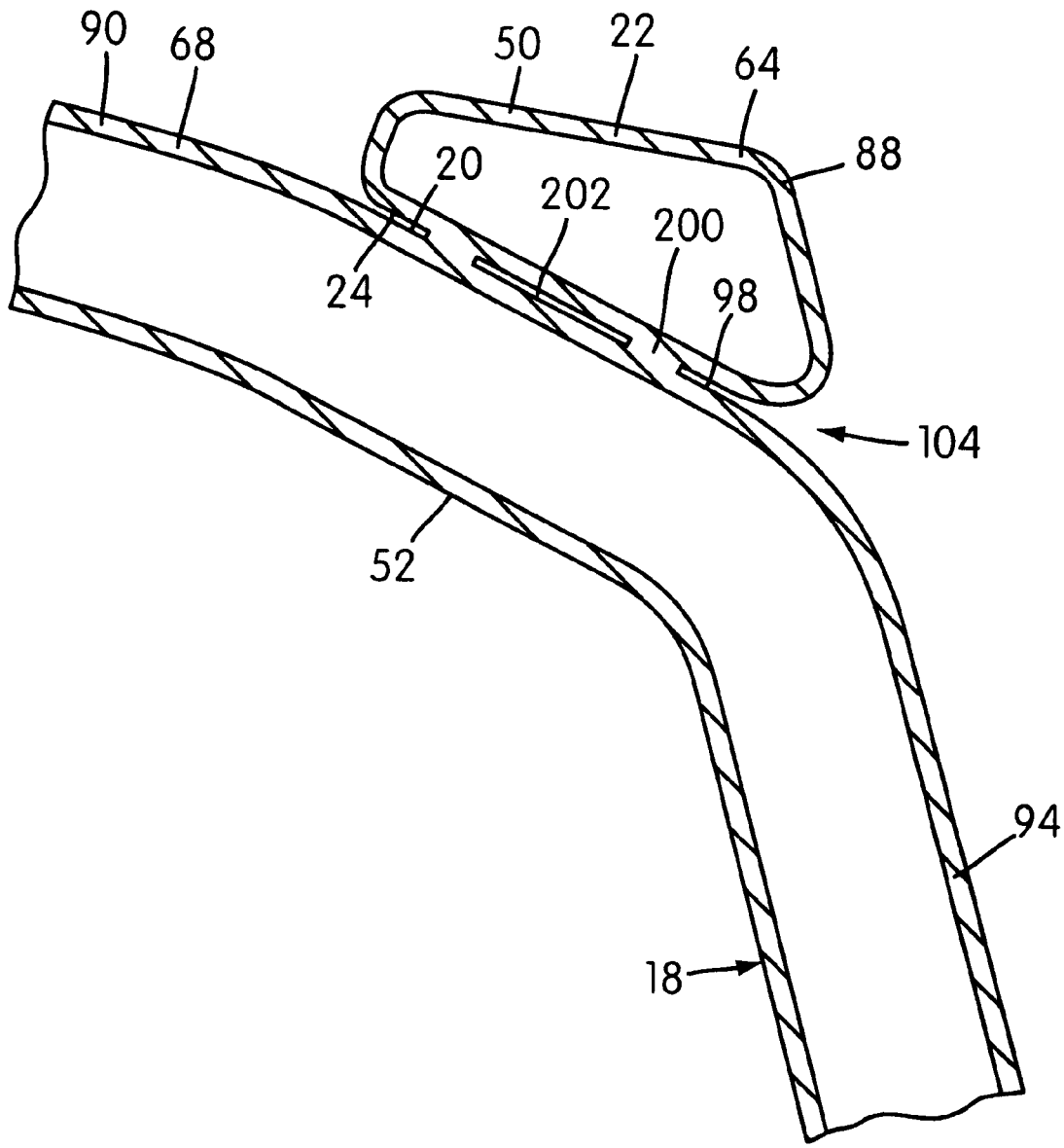
FIG. 5 is a view similar to FIG. 4 except showing the first and second weldable members after joint formation.

FIG. 1 shows welding material members 14 and a weldable member 18. Additionally, a projection welding device is generally indicated at 301. As will become apparent, a plurality of welding material members 14 may be bonded to an exterior surface 20 of the weldable member 18 where a welded connection is to be formed by a welding process and an additional weldable member 22, as seen in FIG. 3, may be positioned in contacting, overlying position relative to the welding material members 14 and weldable member 18, such that the welding material members 14 may be disposed between surfaces of the weldable members 18 and 22. Then, after a welding process, weldable members 18 and 22 are joined at the connection between the two members 18 and 22 through the use of the welding material members 14 as seen in FIG. 5.

Each welding material member 14 is constructed of an electrically conductive metallic welding material capable of melting when heated by application of a sufficient electrical current. Also, each welding material members 14 is intended to be positioned in electrically conductive relation between the exterior surface portions 20 and 24 of first and second weldable members 18 and 22, respectively, at a location where the first and second weldable members 18 and 22 are to be joined. The welded connection is formed by positioning at least one welding material member 14 constructed of a metallic welding material that is different from the metallic material used to construct each of the weldable members 18, 22 between the respective exterior surfaces 20, 24 to be joined.

The size and shape selected for each of the welding material members 14 will depend on many factors including the materials used to construct the weldable members 18 and 22, the material used to construct the welding material members 14 and the size and shape of the joint area between the two weldable members (i.e., the size and shape of the overlapping surface areas of the two weldable members 18 and 22). If the welding material members 14 are intended to be attached to weldable member 18 by welding, the characteristics of the welding material members 14 may be dependent in part on the abilities and limitations of the projection welding device 301 for attaching the weldable member 18. Some characteristics of the weldable material members 14 may also be dependent on the welding device 28, which ultimately welds weldable members 18 and 22. Each welding material member 14 is shown being a circular disc, but can have any appropriate, desired shape.

Figure 2:
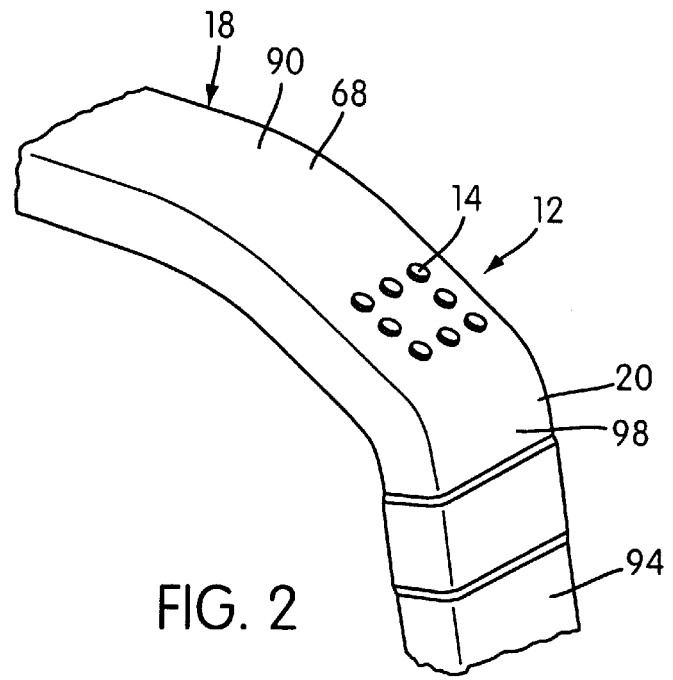
FIG. 2 is a perspective view of a welding material assembly constructed according to the principles of the present invention mounted on a first weldable member.

As mentioned, it is contemplated to provide a single welding material member 14 mounted on member 18. A range of broad, thin shapes (e.g., a large X-shape) of the welding material member 14 is contemplated for instances in which only one welding material member 14 is mounted on member 18. Preferably a plurality of welding material members 14, each being in the form of a small thin disk is mounted on member 18 as seen in FIG. 2. The thin, small diameter disk shape readily permits discreet localized areas of electric current flow between the weldable members 18, 22, which facilitates melting of the members 14.

A preferred welding material for the welding material members 14 is stainless steel in the instance in which the weldable members 18, 22 are constructed of a milder steel such as carbon steel, which is preferred. It is contemplated, however, to use a wide range of metallic welding materials to construct the welding material members 14 and to use the members 14 to form welded connections between weldable members 18 and 22 that are constructed of other materials as well, such as aluminum.

The welding material used to construct each welding material member 14 should be more resistive (i.e., have a greater resistance to the flow of electrical current) and have a lower melting point than the metallic material used to construct each weldable member 18, 22.

At least one and preferably a plurality of welding material members 14 are bonded to the weldable member 18 for later being positioned between the surfaces 20, 24 to be joined (i.e., welded together). Preferably, these welding material members 14 are positioned to maximize joint strength and optimize joint formation. In the illustrated embodiment, each welding material member 14 is a small diameter disk-shaped member as seen in FIGS. 1–3, but it can be understood that a wide range of welding material member 14 shapes and sizes are contemplated.

The welding material members 14 are mounted on weldable support member 18 at a predetermined position so that each welding material member 14 will stay in place on the weldable member 18 until the second weldable member 22 is positioned over the weldable member 18 and on top of welding material members 14. This attachment of welding material members 14 can occur by any appropriate attaching method, such as using adhesives, mechanical fasteners, or welding. In the illustrated embodiment, the attachment of the welding members 14 is accomplished by welding, such as liquid transient welding, and by using welding device 301. As illustrated in FIG. 1, the illustrated process is directed to each of a plurality of welding material members 14 being individually fastened to the surface 20 to be welded by a welding material member welding assembly 300 that includes a resistance welding device 301, a welding member feeder 312, a force applying mechanism 314, and a robotic arm 316. The welding assembly 300 can be similar to stud welding devices such as The Warren Stud Welding System (SKK 140 or SKK 210 Series) manufactured by Emhart Fastening Technologies and which includes a TMP Series Welder Controller, a 36000 Series Stud Feeder and a weld head or weld gun. The welding assembly 300 can also be similar to the WELDFAST System for welding brackets and clips also manufactured by Emhart Fastening Technologies.

It is contemplated that the resistance welding process illustrated in FIG. 1, may be automatically or manually performed. When automatically preformed a controller 310, as generally known in the art, controls the welding assembly 300 and welding device 301.

As shown schematically in FIG. 1, the resistance welding device 301 includes a welding member support structure 302 at one end thereof. Often, the welding member support structure 302 is in the form of a collet or chuck, which is capable of receiving and gripping a periphery of the welding material member 14 in a similar manner as is generally known in the art with respect to stud welding. The welding member support structure 302 is constructed and arranged to grip the periphery of each welding material member 14 relatively securely and to be movable relative to the weldable member 18 to thereby move the welding material member 14 into contact with the surface 20 to be welded. Each welding member 14 would be positioned on the support structure 302 by a nugget feeder 312 that could hold a large number of welding material members 14 and then feed a single nugget or single welding material member 14 to the support structure 302 in a manner generally similar to the feeder of individual studs in a stud welding device. An appropriate force applying mechanism 314 could move and apply sufficient force to the welding material member 14 against the weldable member 18 during welding.

It is contemplated that, for an automated process, the projection welding device 301 may be mounted to robotic arm 316 or other automated movement system, or for a manual process, that the projection welding device 301 may be a handheld device.

In any case, as shown in FIG. 1, the projection welding device 301 is brought into position adjacent a desired location for a welding material member 14 to be placed on the surface 20 to be welded. The welding device 301 then moves along with the welding material member 14 in its support 302, toward the surface 20 to be welded. At a point when the welding material member 14 is substantially in contact with the surface 20 to be welded, a current is applied across the welding material member 14 between the projection welding device 301 (more specifically, the welding member support structure 302) and the weldable member 18. The current causes the welding material member 14 to bond (by liquid transient welding) to the weldable member 18 at a point of greatest resistance, i.e., the intersection between the surface to be welded 20 and the welding material member 14, as shown in FIG. 1. To illustrate the steps, FIG. 1 illustrates a welding material member 14 to the right that is welded to surface 20, a middle welding material member 14 between the surface 20 and the support structure 302 that is being welded, and a left welding material member 14 that has yet to be welded and would be supplied, for instance by feeder 312.

The welding material members 14 may be fastened to the weldable member 18 in any arrangement desirable. FIG. 2 shows one such arrangement. Other arrangements are, of course, possible as long as sufficient weldable material is present to form a sufficiently strong welded bond (e.g., the welding material members 14 are in sufficient number and size).

To form a joint in accordance with the method of the invention, the welding material members 14 are bonded to the hydroformed member 18 in a desired arrangement. The second weldable member 22 is then placed in contacting, overlying relation to the welding material members 14 so that the welding material members 14 are disposed between and in conductively contacting relation to the weldable members to be joined 18, 22, as shown in FIGS. 3 and 4.

The welding method can be understood from FIGS. 1–5. FIG. 2 shows welding material members 14 mounted on an exterior surface portion 20 of first weldable member 18, which is illustrated in the form of a tubular member. FIG. 3 shows a first weldable member 22 in the form of a second tubular member disposed in overlying relation to the first weldable member 18 with the welding material members 14 disposed therebetween. The weldable members 18 and 22 are intended to be a generic representation of two members that can be welded together using welding material members 14 in a manner described below. Although members 18 and 22 can be hydroformed tubes, the tubular members 18 and 22 illustrated herein can be formed by any appropriate method. Additionally, although the members 18 and 22 are illustrated as being tubular, with closed cross-sections, other shapes and configurations of members 18 and 22 are permissible including tubular configurations with open cross-sections and non-tubular configurations. As will become apparent, the exemplary members 18 and 20 are used to illustrate the welding process and are portions of individual hydroformed members that are joined together to form part of a space frame as shown in FIG. 5. A modified resistance weld apparatus, or welding device, generally designated 28, is shown schematically in FIG. 4 engaged with the weldable members 18, 22. FIG. 5 shows the weldable members 18 and 22 after joint formation.

Figure 4:
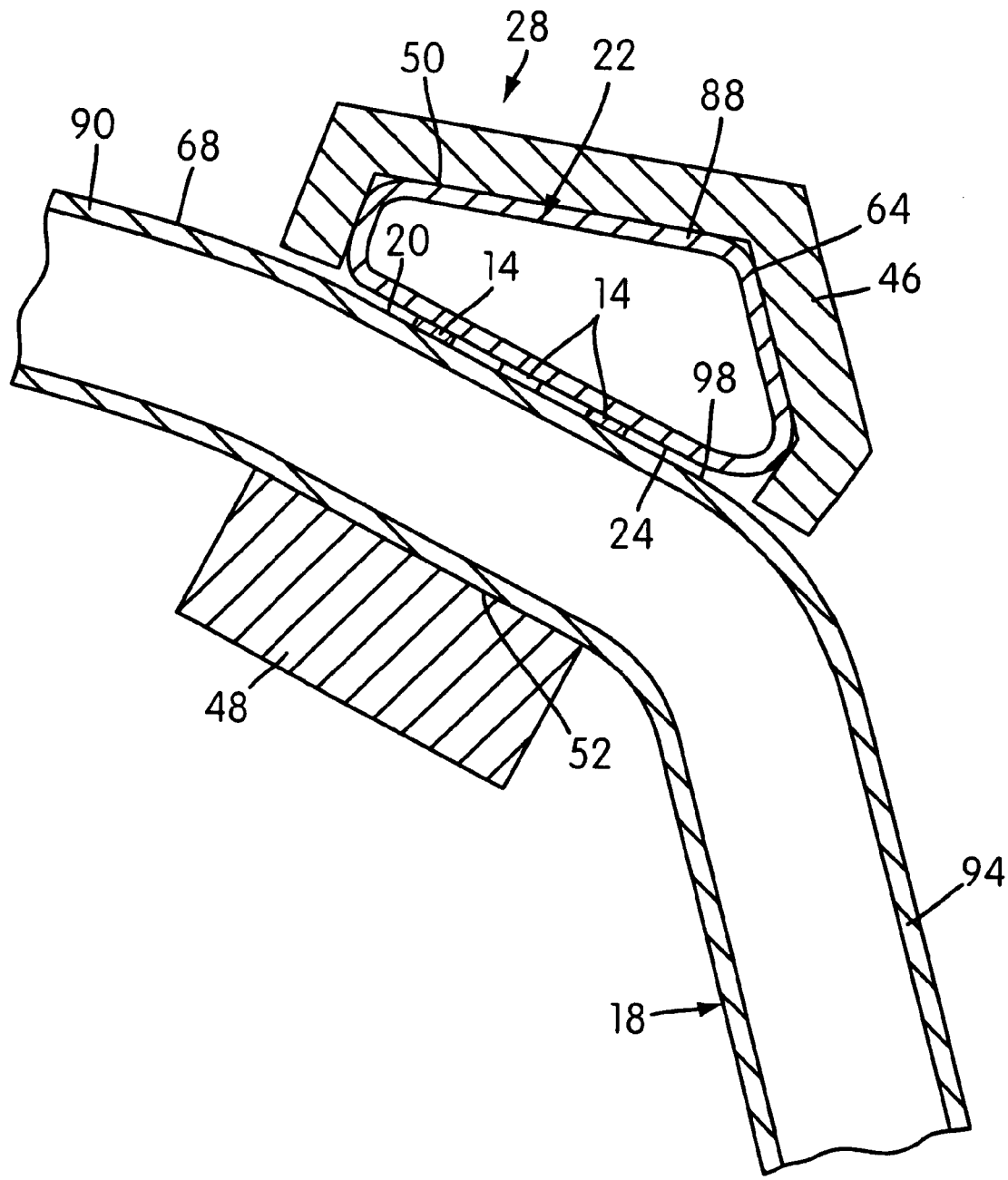
FIG. 4 is a sectional view taken along line 4—4 of FIG. 3 and showing the welding material assembly disposed between the first weldable member and a second weldable member prior to joint formation and showing a schematically represented resistance welding apparatus engaged with the weldable members.

The welding process illustrated in FIGS. 4 and 5 is a derivative of resistance welding and utilizes transient liquid phase bonding and resistance heating. The welding material members 14 and the projection welding process can be used, for example, to join together two tubular hydroformed members 18, 22. The welding material members 14 and the illustrated method of resistance welding provides a way for individual hollow sections of the pair of weldable members 18, 22 to be welded together in adjoining relation without direct access to the welding surfaces 20, 24, respectively, while the welded connection 200 (or joint) is being formed.

The modified resistance weld gun apparatus 28, or welding device, (or a modified spot welding gun) is used to apply an electrical current and an axial force (i.e., a force perpendicular to the two exterior surfaces 20, 24 in the weldable members 18, 22) across the two hydroformed members 18, 22 and across the welding material members 14 during joint formation. More particularly, the apparatus 28 includes a pair of current conducting members 46, 48, or conductive ends, (that supply an electrical current from a current source to form the weld) that are applied to exterior surfaces 50, 52 of the two hydroformed members 18, 22 to be joined in the area where the weld connection or joint therebetween is to be formed. The weld gun apparatus 28 can be controlled manually or robotically. An appropriate apparatus and method for welding members 18 and 22 is disclosed in commonly assigned U.S. patent application Ser. No. 09/754114 for a Welding Assembly with Nestable Conductive Ends, filed on Jan. 5, 2001, the entire contents of which are hereby incorporated herein by reference thereto.

The conductive members, or conductive ends 46, 48, are electrodes that cause a current to flow through the surfaces 20, 24 to be bonded (i.e., joined) and through the welding material members 14. The welding material is more resistive and has a lower melting point than the base joint metallic material used to construct the hydroformed members 18, 22. The material properties of the contiguous members 14, 18, 22 combine to create preferential heating and subsequent localized melting of the welding material members 14 prior to the melting of the hollow section material of the hydroformed members 18, 22. The welding material members 14 liquefy during the welding process.

The energy required to liquefy the welding material members 14 is generated by the applied electrical current. The welding material members 14 heat up preferentially and cause melting of the welding material members 14 and then localized melting of the adjacent metallic material of the weldable members 18, 22. The melted material of the welding material members 14 bonds with the basic metallic material of the hydroformed members 18, 22 under the axial pressure applied by the conductive members, or conductive ends 46, 48. After the aforementioned melting occurs, the current flow through the surfaces 20, 24 is switched off. The axial force is preferably removed a predetermined amount of time thereafter.

The resulting welded connection is represented in FIG. 5. As shown, depending on the number, size, and configuration of the welding material members 14, a very thin gap 202 may be left between the weldable members 18, 22 as seen in FIG. 5, or no gap may exist and the connection 200 may be a continuous, homogenous connection between the weldable members 18 and 20. The combining of the metallic materials of the metal members 14, 18, 22 is indicated in the cross sectional view of FIG. 5. It can be appreciated that this representation of the welded area is enlarged and exaggerated to more clearly illustrate the welded connection and to indicate the mixing of the metallic materials in the areas where the weld is formed.

Preferably the current is applied through the first weldable member 22 and the second weldable member 18 and across the welding material members 14 so as to melt the welding material members 14 and thereafter to melt portions of the first weldable member 22 and the second weldable member 18 in areas thereof that are adjacent to the welding material members and preferably the forces are applied so as to move the exterior surfaces 20, 24 toward one another.

Preferably, each of the exterior surfaces 20, 24 is planar, although they may be of any configuration that is adapted for joint formation. For example, the surfaces can have complimentary convex/concave configurations and the like.

Figure 6:
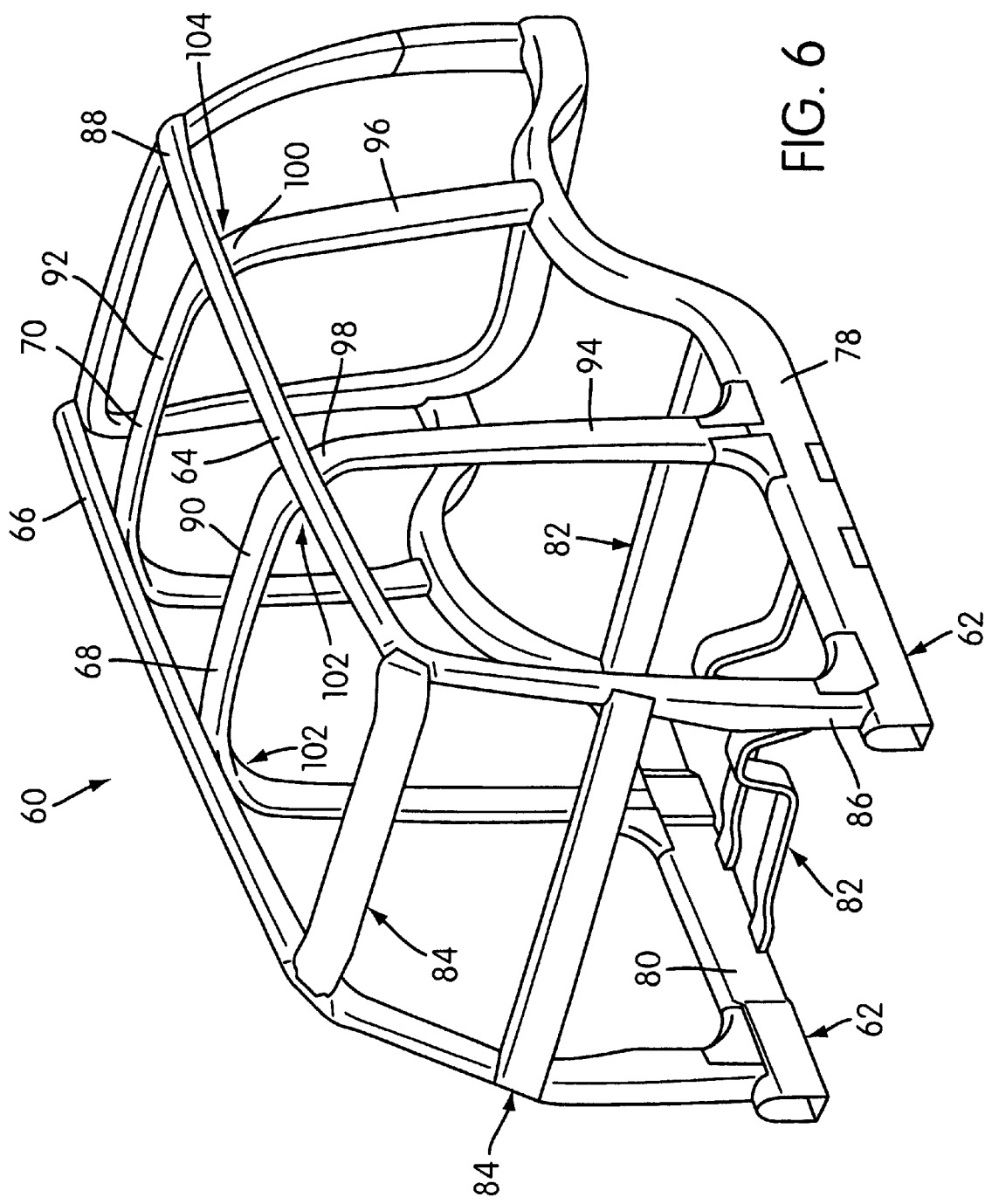
FIG. 6 shows a perspective view of a space frame for a motor vehicle that includes joints formed according to a method of the present invention.

As seen in FIG. 6, it is contemplated to use the welding material members 14 and the projection welding process of the present invention to form joints between the individual members 18 and 22 used to construct a space frame 60 for a motor vehicle. An example of a method for using the projection welding process to bond welding material members 14 to a member for forming a space frame 60 joint is described below. The example is described with reference to an exemplary embodiment of a space frame for a sports utility vehicle shown in FIG. 5. Other examples of space frame joints that are particularly well suited for use with the present welding material assemblies and with methods utilizing the assemblies are disclosed in commonly assigned U.S. Pat. Ser. No. 6,092,865 and entitled HYDROFORMED SPACE FRAME AND METHOD OF MANUFACTURING THE SAME, which is hereby incorporated by reference in its entirety into the present application.

FIG. 5 shows a perspective view of a motor vehicle space frame 60. The space frame 60 includes a pair of longitudinally extending, laterally spaced side rail structures 62, a pair of hydroformed upper longitudinal members 64, 66, a pair of hydroformed U-shaped cross members 68, 70 and a rearward ring assembly 72. Preferably the side rail structures 62 are provided by a pair of hydroformed members 78, 80 of mirror image construction. A plurality of laterally extending cross structures generally designated 82 are connected between the side rail structures 62 and a pair of laterally extending upper cross structures 84 are connected between the pair of upper longitudinal members 64, 66.

Each hydroformed upper longitudinal member 64, 66 includes a pillar forming portion 86 and a longitudinally extending portion 88. Each upper longitudinal member 64, 66 is connected to an associated side rail structure 62 and extends upwardly therefrom to form an A pillar of the space frame 60. Each hydroformed cross member 68, 70 includes a cross portion 90, 92, respectively, and a pair of leg portions 94, 96, respectively, extending from junctures 98, 100 at opposite ends of the associated cross portion. Each leg portion of the cross member is connected to a respective side rail structure 62 and extends upwardly therefrom to provide an intermediate pillar thereon (i.e., the B pillars and C pillars). The longitudinally extending portion 88 of each upper longitudinal member 64, 66 is connected to the juncture 98, 100 of the associated cross member 68, 70 to form a joint 102, 104, respectively.

While the use of welding material members and the projection welding process provide particular advantages in welding tubular hydroformed weldable members, it is contemplated that they may also have application in welding other weldable members that have not been hydroformed, but which nevertheless inhibit access to the weld surfaces.

Additionally, the above-described apparatus and method permit the attachment of welding material members 14 without the use of any backing that would hold the welding material members 14 in a predetermined configuration prior to their attachment to weldable member 18. Thus, saving in backing sheets can be achieved in the attachment of the welding material members 14 without any backing sheets. While the members 18 and 22 join to form a single joint 102 in space frame 60 as illustrated in FIG. 5, it should be understood that the methods and apparatus to join members 18 and 22 can be used for any of the numerous joints of space frame 60 and as illustrated in FIG. 5.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed is:

1. A method of welding tubular members, comprising:
providing first and second tubular members, each of the first and second tubular members having a respective exterior surface;
providing at least one welding material member, each of the at least one welding material member being constructed of an electrically conductive metallic welding material capable of bonding in weld-forming relation with the first and second tubular members;
securing each of the at least one welding material member on the first tubular member so that each of the at least one welding material member remains in a predetermined position on the first tubular member prior to being in contact with the second tubular member;
positioning the second tubular member adjacent the first tubular member with the at least one welding material member being disposed in current transmitting relation between the respective exterior surfaces of the first and second tubular members; and
applying an electrical current across the first and second tubular members such that the applied current flows through the respective exterior surfaces of the first and second tubular members and each of the at least one welding material member disposed between the first and second tubular members to weld the respective exterior surfaces of the first and second tubular members together.

2. A method according to claim 1, wherein the providing of the first and second tubular members includes hydroforming each of the first and second tubular members by a process of providing a tubular metallic blank having a tubular metallic wall,
placing the tubular metallic blank into a die cavity of a die assembly, the die cavity having die surfaces, and
providing a high pressure fluid into an interior of the blank to expand the metallic wall of the blank outwardly into conformity with the surfaces of said die cavity.

3. A method according to claim 1, wherein the providing at least one welding material member includes providing a plurality of welding material members.

4. A method according to claim 1, wherein the providing at least one welding material member includes providing at least one steel welding material member.

5. A method according to claim 1, wherein the providing at least one welding material member includes providing at least one disk-shaped member.

6. A method according to claim 1 wherein the securing of each of the at least one welding material member is accomplished by welding.

7. A method according to claim 1, wherein the securing of each of the at least one welding material member is accomplished by a resistance welding device, said resistance welding device holding one of the at least one welding material member in position on the first tubular member and applying an electrical current across the one of the at least one welding material member and the first tubular member to melt a portion of the one of the at least one welding material member and weld the one of the at least one welding material member to the exterior surface portion of the first tubular member.

8. A method according to claim 7, wherein the resistance welding device performs the securing of the at least one welding material member projection under the direction of a computer controlled device.

9. A method according to claim 1, wherein the electrical current is applied across the first and second tubular members and across each of the at least one welding material member to melt each of the at least one welding material member and to melt respective portions of the first and second tubular members in areas adjacent each the at least one welding material member and wherein forces are applied to move the respective first and second exterior surface portions of the first and second tubular members toward one another as the melting occurs.

10. A method of welding tubular members, comprising:
providing first and second tubular members, each of the first and second tubular members having a respective exterior surface;
providing a plurality of welding material members, each of the welding material members being constructed of an electrically conductive metallic welding material capable of bonding in weld-forming relation with the first and second tubular members;
welding each of the plurality of welding material members on the first tubular member so that each of the plurality of welding material members remains in a predetermined position on the first tubular member prior to being in contact with the second tubular member;
positioning the second tubular member adjacent the first tubular member with the plurality of welding material members being disposed in current transmitting relation between the respective exterior surfaces of the first and second tubular members; and
applying an electrical current across the first and second tubular members such that the applied current flows through the respective exterior surfaces of the first and second tubular members and each of the plurality of welding material members disposed between the first and second tubular members to weld the respective exterior surfaces of the first and second tubular members together.

11. A method according to claim 10, wherein the providing of the first and second tubular members includes hydroforming each of the first and second tubular members by a process of providing a tubular metallic blank having a tubular metallic wall,
placing the tubular metallic blank into a die cavity of a die assembly, the die cavity having die surfaces, and
providing a high pressure fluid into an interior of the blank to expand the metallic wall of the blank outwardly into conformity with the surfaces of said die cavity.

12. A method according to claim 10, wherein the providing a plurality of welding material members includes providing a plurality of steel welding material members.

13. A method according to claim 10, wherein the providing of a plurality of welding material members includes providing a plurality of disk-shaped welding material members.

14. A method according to claim 10, wherein the welding of each of the plurality of welding material members is accomplished by a resistance welding device, the resistance welding device holding one of the plurality of welding material members in position on the first tubular member and applying an electrical current across the one of the plurality of welding material members and the first tubular member to melt a portion of the one of the plurality of welding material members and weld the one of the plurality of welding material members to the exterior surface portion of the first tubular member.

15. A method according to claim 14, wherein the resistance welding device performs the securing of the plurality of welding material members under the direction of a computer controlled device.

16. A method according to claim 10, wherein the electrical current is applied across the first and second tubular members and across each of the at least one welding material member to melt each of the at least one welding material member and to melt respective portions of the first and second tubular members in areas adjacent each the at least one welding material member and wherein forces are applied to move the respective first and second exterior surface portions of the first and second tubular members toward one another as the melting occurs.

* * * * *